United States Patent [19]

Holenka et al.

[11] Patent Number: 5,023,449

[45] Date of Patent: Jun. 11, 1991

[54] NUCLEAR SPECTROSCOPY SIGNAL STABILIZATION AND CALIBRATION METHOD AND APPARATUS

[75] Inventors: Jacques M. Holenka, Houston; W. R. Sloan, Missouri City, both of Tex.

[73] Assignee: Schlumberger Technology Corporation, Houston, Tex.

[21] Appl. No.: 400,847

[22] Filed: Aug. 30, 1989

[51] Int. Cl.$^5$ .......................... G01V 5/04; G01V 5/06
[52] U.S. Cl. ................................ 250/252.1; 250/261; 250/265; 250/269; 250/367
[58] Field of Search ................ 250/252.1 R, 261, 265, 250/269, 366, 367; 364/421

[56] References Cited

U.S. PATENT DOCUMENTS

| Re. 30,827 | 12/1981 | Pelet et al. | 73/152 |
|---|---|---|---|
| 2,769,916 | 11/1956 | Tittle | 250/391 |
| 3,101,409 | 8/1963 | Fite | 250/363.01 |
| 3,562,526 | 2/1971 | Lawson | 250/266 |
| 3,633,030 | 1/1972 | Antkiw et al. | 250/261 |
| 3,900,731 | 8/1975 | Chevalier et al. | 250/207 |
| 3,922,541 | 11/1975 | Seeman | 250/256 |
| 3,935,556 | 1/1976 | Kampfer | 340/257 |
| 3,955,088 | 5/1976 | Muehllehner et al. | 250/363.03 |
| 3,976,878 | 8/1976 | Chevalier et al. | 250/253 |
| 4,053,767 | 10/1977 | Kampfer et al. | 250/252.1 |
| 4,220,851 | 9/1980 | Whatley, Jr. | 250/252.1 |
| 4,418,282 | 11/1983 | Horrocks | 250/366 |
| 4,433,240 | 2/1984 | Seeman | 250/256 |
| 4,450,354 | 5/1984 | Smith, Jr. et al. | 250/256 |
| 4,578,578 | 3/1986 | Lin et al. | 250/252.1 |
| 4,580,048 | 4/1986 | Dion | 250/256 |
| 4,668,863 | 5/1987 | Gray et al. | 250/256 |
| 4,945,233 | 7/1990 | Jorro | 250/252.1 |

FOREIGN PATENT DOCUMENTS 1077483 10/1971 France .

OTHER PUBLICATIONS

Strauss, M. G. et al., "Simple and Accurate Calibration Technique for Measuring γ-ray Energies and Ge(Li) Detector Linearity", *Nuclear Instruments and Methods*, vol. 76, No. 2, (1969), pp. 285-294.

Axton, E. J., "Neutron Calibrations: A Review", *Nucleonics*, (Mar. 1961), pp. 90-94.

Chastel, A. et al. "A Convevient Calibration Technique for Neutron Detectors", *Nuclear Instruments and Methods*, vol. 94, No. 3, (1971) pp. 493-496.

Hankins, D. E., "Phantoms for Calibrating Albedo Neutron Dosimeters", *Health Physics, vol. 39, No. 3, (Sep. 1980)., pp. 580-584.*

Glenn F. Knoll, "Radiation Detection and Measurement", 1988, editor John Wiley Sons, pp. 656-660, 670-672, and 631.

J. Paulus et al., "Comparative Timing Performance of Large Volume HPGe Germanium Detectors", (1981), IEEE Transactions on Nuclear Science, vol. NS-28, No. 1, Feb. 1981, pp. 544-548.

*Primary Examiner*—Constatine Hannaher
*Assistant Examiner*—Jacob Eisenberg
*Attorney, Agent, or Firm*—Henry N. Garrana; Frederic C. Wagret

[57] ABSTRACT

Nuclear spectroscopy method and apparatus for the stabilization of an energy spectrum, made from a signal, emitted by a radiation detector, and containing nuclear events, represented by pulses, whose amplitude is a measure of the energy of the particles, such as gamma rays, collected by the detector, the spectrum including at least a first reference energy peak coming from an ancillary nuclear source, wherein the method comprises: detecting the radiation under analysis by two detectors between which is placed the ancillary source; establishing at least one coincident spectrum corresponding to pairs of events simutaneously detected in both detectors and originating from the ancillary source; and stabilizing the coincident spectrum by using one energy peak of said spectrum as said first reference energy peak.

29 Claims, 4 Drawing Sheets

NUCLEAR SPECTROSCOPY SIGNAL STABILIZATION AND CALIBRATION METHOD AND APPARATUS

BACKGROUND OF THE INVENTION

1. Field of the invention

The present invention relates to a method and an apparatus for the gain stabilization and the calibration of a signal issued from a nuclear detector device.

2. The prior art

Such devices are commonly used in many technical areas where measurements involve nuclear particles and radiation detection, one among others being e.g. the well logging techniques, wherein a tool is lowered in a well to carry out physical measurements.

Of the many well logging instruments and techniques developed over the years to determine the characteristics, such as the hydrocarbon content and productivity, of earth formations, the nuclear spectroscopy tool, by which energy spectra of the constituents of formation matrices and fluids are generated, more specifically in which gamma rays are detected, has been found to provide information of particular value in formation analysis.

These gamma rays can be due to the natural radioactivity of the formations or result from the irradiation of these formations by a neutron or gamma ray source. The detection of these gamma rays, whether from natural or induced radioactivity, can be carried out separately for several distinct windows or energy ranges in order to obtain information on the energy spectrum of these gamma rays. Analysis of the obtained spectrum then furnishes information on the lithology of the formations.

As an example, an apparatus for analyzing the spectrum of natural gamma rays is described in U.S. Pat. No. 3,976,878 (P. Chevalier and B. Seeman). In that apparatus, the detection system comprises a scintillation crystal, a photomultiplier, a linear amplifier and a pulse height analyzer. In the pulse height analyzer, the energy spectrum of the gamma rays is divided into five windows. The count rates of the different windows make it possible to calculate the thorium, uranium, and potassium (T,U,K,) contents of the formations. In this technique, as in all those using a spectral study i.e. discrimination by the energy of the received radiation, it is extremely important for measurement accuracy to equip the detection system with gain stabilization means. In fact, gamma ray detection systems, and in particular photomultipliers and crystals, exhibit significant gain variations due especially to temperature changes or changes in the count rates. A stabilization method frequently used, and described in the above mentioned patent, consists of an auxiliary gamma ray source that emits a characteristic gamma ray whose energy is below the range of interest in the detected spectrum. In this method, an Americium source (Am 241) is chosen, the primary emission peak of which is located at 60 KeV. Two count rates $M_1$ and $N_1$ are measured in two windows of predetermined width located on each side of the 60 KeV energy and an error signal, which is a function of the difference $(M_1 - N_1)$, is used to control the high voltage of the photomultiplier through a negative feedback loop. The above described stabilization technique is suitable for those portions of the spectrum close to the emission peak. However, for the same gain variation, the spectrum energy scale is shifted by greater amounts at higher energies. Therefore, the detection of the shift at low energies is not entirely satisfactory for correcting shifts at higher energies and, due to statistical variations in the count rates, errors appear. In addition, when large scintillator crystals are used, the low energy gamma rays of the auxiliary source reach only a part of the crystal, which is all the more smaller when the crystal has high efficiency. Thus, the resulting stabilization is seriously affected by any crystal heterogeneity and/or temperature gradients in the crystal.

The U.S. Pat. No. 3,101,409 (L. E. Fite) proposes a stabilization using two peaks coming from two auxiliary gamma ray sources. One of the peaks is used to control the high voltage of the photomultiplier while the other peak is used to control the lower threshold of the pulse height discriminator. The two stabilization loops are independent and do not make it possible to solve the case in which one of the peaks in not present. In this patent, this problem is not addressed because the peaks come from two auxiliary monoenergetic gamma ray sources especially added to the apparatus for stabilization.

According to U.S. Pat. No. 3,922,541, a gain stabilization method is proposed wherein a reference radiation source (having a predetermined energy spectrum) is located adjacent to the scintillator. A reference signal representative of the relationship between the predetermined energy spectrum from the reference radiation source is produced.

It has also been proposed, in U.S. Pat. No. 4,433,240 (B. Seeman), a gamma ray detection apparatus that includes a stabilization loop based upon the detection of several peaks at different energy levels located in the energy range of the detected spectrum. Discrimination means separates the electric pulses, representative of the gamma rays, the amplitudes of which fall within two first contiguous windows located on each side of a first predetermined value and within two second contiguous windows located on each side of a second predetermined value. These predetermined values correspond to two reference energies or peaks located in the detected spectrum of gamma rays coming from the formations. This known apparatus further includes another stabilization loop based upon an auxiliary gamma ray source the emission peak of which is located outside of the detected spectrum of the formations. This apparatus, although being an improvement over the above mentioned apparatus, relies on high energy peaks which are part of the measurements themselves. Since these energy peaks have to be removed from the total energy spectrum, this decreases the reliability of the measurements.

Another gain stabilization method has been proposed, by using a reference signal, either of the electrical type or of the light type, such as that of U.S. Pat. No. 4,220,851 including a light diode driven by a pulser, mounted between the scintillator and the photomultiplier, and emitting light pulses constituting reference pulses of constant energy (above 8 Mev). However, the resulting gain stabilization is based on a reference signal which does not affect the crystal, thus does not obviate any drift occurring in the latter. Furthermore, the high reference energy (above 8 Mev) used does not fit the energy range encountered in current spectra analysis (usually below 1.5 or 2 Mev). Finally, this method relies on the yield stability over the time of the light source.

In the same vein, U.S. Pat. No. 3,900,731 contemplates a method and apparatus for stabilizing the gain of a photomultiplier by compensating its variations through a modification of the illumination of its cathode.

Gain stabilization methods based on the measurements of coincident nuclear events have also been proposed.

In this respect, U.S. Pat. No. 2,769,916 shows a neutron detecting device provided with two facing scintillation detectors between which is disposed a foil of neutron-gamma reactive material, i.e. able to produce, upon bombardment by an incident neutron, gamma rays, two of which are emitted simultaneously and thus detected simultaneously in both detectors. However, this device does not provide any gain stabilization.

U.S. Pat. No. 4,450,354 (H. D. Smith and C. A. Robbins), depicts a method for the natural gamma ray detection of the casing thickness in a cased well borehole, using an ancillary detector which is substantially smaller than the regular detector used for the measurements. The gain stabilization is achieved by using an ancillary nuclear source (Am 241) emitting practically simultaneously an alpha particle which is detected by the ancillary small detector, and a photon-gamma radiation of 60 Kev which is detected only by the regular large detector. A coincidence circuit, each time an alpha particle and a photon-gamma are simultaneously detected, actuates a stabilizing circuit which increases or decreases the amplifier gain depending upon the actual energy (as measured) of the photon-gamma particle being below or above the theoretical energy value of 60 Kev. However, this method is not fully satisfactory. Firstly, the reference energy peak is in the low part of the energy range. Secondly, the ancillary source and the ancillary detector (plus the shields) increases the complexity of the logging tool, thus the cost and size. Thirdly, the two detectors are different with regard to (i) size: one is small and the other is large, (ii) material: one detects alpha particle, the other detects gamma rays, and (iii) use: only one detector is sensitive to particles representative of the earth formation.

It can be seen from the above that the attempts made until now towards a better gain stabilization are not fully satisfactory.

Moreover, the safety concern with respect to nuclear sources has indubitably increased over the years. Accordingly, the regulations have become more and more stringent. For example, the activity (measured in microCurie or nanoCurie) of the sources should not exceed a given value. It is, however, difficult to determine and find a nuclear source which complies with the regulations as well as the needs of the industry.

Furthermore, there is a demand for improving the sensitivity of the detectors commonly used, such as NaI (sodium iodide) detectors. For instance, U.S. Pat. No. 3,633,030 shows a logging tool including means attempting to improve the energy resolution of the detector. It includes one or two NaI scintillator(s), disposed close to a semiconductor radiation detector which, upon receipt of a gamma rays coming from the formation, emits an electron and a positron. The positron produces two simultaneous, oppositely directed gamma rays, which are detected by each detector. Scintillator signals are applied to a gating circuit which passes or inhibits the signal from the semiconductor detector, thus allowing delivery of a coincidence or anticoincidence spectrum. This device does not provide any gain stabilization, and is directed to the elimination of the Compton production radiation. Furthermore, the semiconductor requires thermal protection, which increases the costs.

Moreover, as a general consideration, the higher the count sensitivity of a nuclear detector, the bigger its size. This leads to an increased bulk and to an enhanced difficulty in stabilizing the spectrum with a low energy peak, since only a small part of the detector is actually affected by the ancillary source, and thus is not representative of the entire detector.

Accordingly, there is a general need for a method and apparatus for stabilizing the nuclear spectrum signal generated by nuclear detectors, and thus correcting (i) for any offset, wherein the spectrum is uniformly translated, and (ii) for any gain drift which implies the spectrum is "stretched".

SUMMARY OF THE INVENTION

It is a first object of the invention to provide a nuclear spectroscopy method and apparatus with enhanced stabilization features along the whole energy spectrum.

A second object of the invention is to propose a nuclear spectroscopy method and apparatus with an increased detection sensitivity.

According to a third object of the invention, it is proposed a spectroscopy method and apparatus including features for offset correction purpose.

The foregoing and other objects are attained in accordance with the invention by a nuclear spectroscopy method for the stabilization of an energy spectrum, made from a signal, emitted by a radiation detector, and containing nuclear events, represented by pulses, whose amplitude is a measure of the energy of the particles, such as gamma rays, collected by said radiation detector, said energy spectrum including at least a first reference energy peak coming from an ancillary nuclear source, wherein said method comprises the steps of:

(1) detecting the radiation under analysis by two detectors;

(2) establishing at least one coincident spectrum corresponding to pairs of events simultaneously detected in both detectors, said event pairs coming from said ancillary source; and (3) stabilizing said coincident spectrum by using one energy peak of said spectrum as said first reference energy peak.

Advantageously, said ancillary nuclear source is placed between the respective facing ends of said two detectors.

Preferably, detectors are both made of bismuth germanate crystal, of the formula $Bi_4Ge_3O_{12}$ (hereafter BGO).

The nuclear activity of said ancillary source corresponds to a level which is substantially smaller than the activity level of the radiation under analysis.

The method further includes, for each detector, establishing a non coincident spectrum representative of the non coincident events.

The ancillary source is made of $^{22}Na$. Briefly, this source allows the simultaneous emission of (i) a positron which, by annihilation, emits a pair of opposed directions gamma rays of 0.511 Mev, and (ii) a 1.27 Mev gamma ray.

Advantageously, the method includes a calibrating step (for offset correction purpose) using said first reference peak and a second reference energy peak. Preferably, said second reference energy peak comes from said ancillary source.

In a preferred embodiment, said first reference peak is at 0.511 MeV, and said second reference peak is at 1.78 MeV.

The characteristics and advantages of the invention will appear better from the description to follow, given by way of a non limiting example, with reference to the appended drawing in which:

DESCRIPTION OF THE PREFERRED EMBODIMENT

Figure 1:
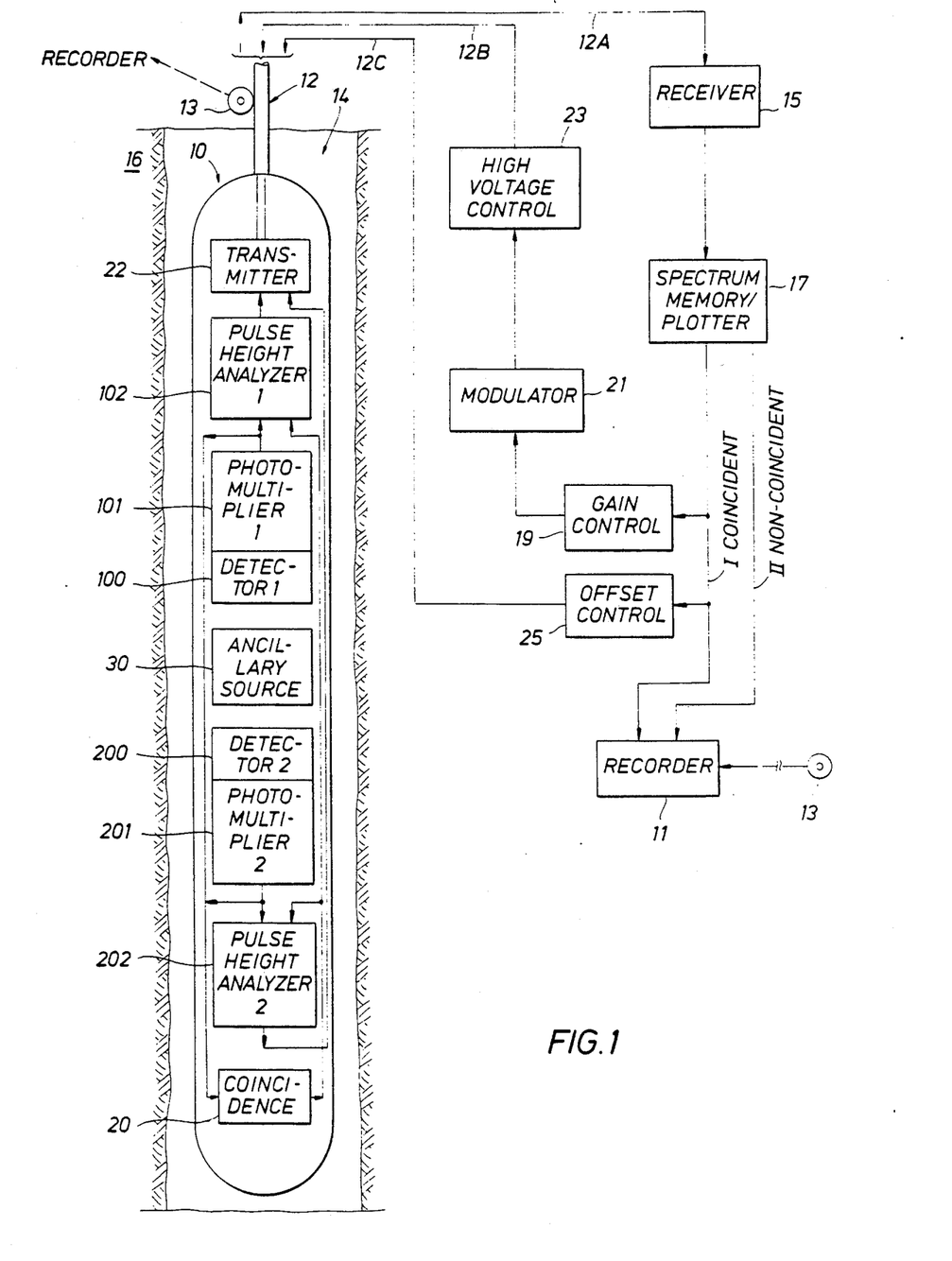
FIG. 1 is a schematic view of an example of implementation of the invention in the form of a logging tool suspended in a well.

Referring to FIG. 1, a logging sonde 10 is shown suspended by an armored cable 12 in a borehole 14 surrounded by earth formations 16. A depth measuring device 13, disposed close to the surface, is associated in the usual manner to the cable 12 and to a surface recorder 11. The cable 12 includes, between the output of the sonde 10 and the surface recorder 11, a first link 12A, a second link 12B and a third link 12C. The nuclear measurements carried out in the sonde, as a function of depth, are transmitted along the cable 12 towards the surface recorder 11, successively via surface cable link 12A, a receiver 15, and a spectrum memory/plotter 17. Said memory/plotter 17 is connected to said recorder 11 via a line I corresponding to coincident spectra and a line II corresponding to non coincident spectra. The second link 12B is connected to line I at the output of the spectrum memory/plotter 17, and includes successively, a gain control unit 19, a modulator 21 and a high voltage control unit 23. The third link 12C is connected to said line I and comprises an offset control unit 25. It is meant here by "memory/plotter" a device designed to count and record (or memorize) counts so as to establish the corresponding energy spectrum.

Within the sonde are provided downhole devices, including a first nuclear detector 100 associated to a first photomultiplier 101, which output feeds a first pulse height analyzer 102 linked to a transmitter 22 allowing transmission of data through cable 12. The downhole devices, inside the sonde 10, also comprise a second nuclear detector 200 associated to a second photomultiplier 201 feeding a second pulse height analyzer 202 itself also linked to the transmitter 22. The outputs of the respective photomultipliers 101, 201 are connected to a coincidence circuit 20, itself linked to additional inputs respectively provided in the first and second pulse height analyzers 102, 202.

Between the detectors 100 and 200 is disposed an ancillary nuclear source 30, in this case, a $^{22}$Na source.

Figure 2:
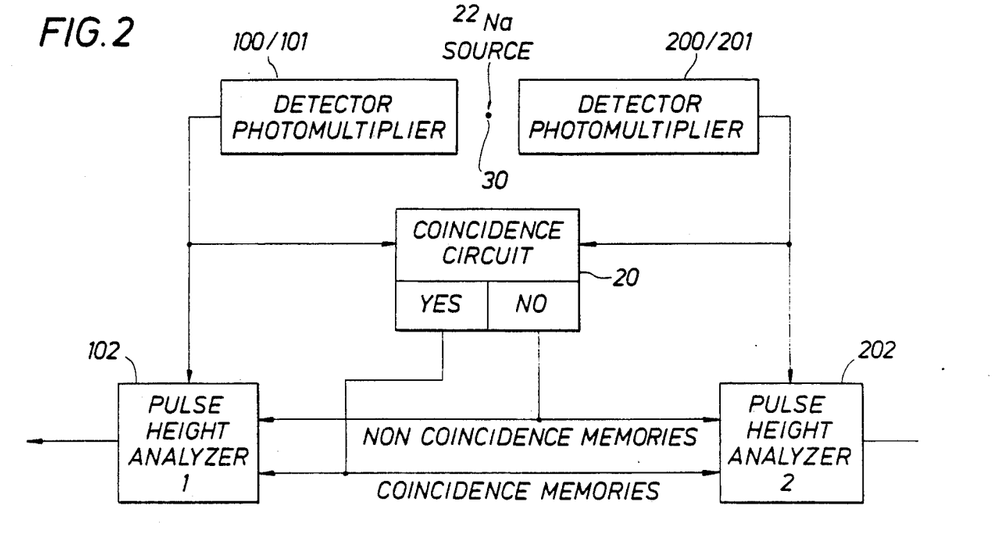
FIG. 2 is a diagrammatic illustration of a detailed part of the invention.

FIG. 2 shows in greater detail the relationship between the detectors, photomultipliers, pulse height analyzers and the coincidence circuit 20.

The two detectors 100 and 200 are scintillation crystal detectors, and more particularly include bismuth germanate crystal, of the formula $Bi_4Ge_3O_{12}$, hereafter referred to as BGO. By way of non limiting example, the BGO detectors 100 and 200 are of cylindrical shape of 8 inches (20.8 centimeters) length in the longitudinal direction, and of 2 inches (5.1 centimeters) diameter (in the transverse direction).

Figure 3:
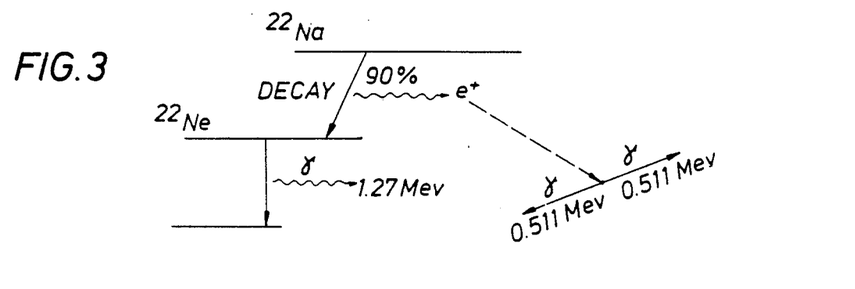
FIG. 3 is a sketch illustrating the nuclear radiation emitted by the ancillary source.

FIG. 3 is a symbolic illustration of the nuclear reaction taking place in the ancillary source 30. $^{22}$Na decays to $^{22}$Ne by emitting, over 90% of the time, a positron (i.e. a particle of the size of an electron and positively charged), and, less than 10% of the time, by electron capture. The positron is annihilated in a very short time (a few nanosecond) while emitting two gamma rays of the same energy 0.511 Mev and of opposed directions (i.e. 180 degrees apart). $^{22}$Ne atom (resulting from the decay of $^{22}$Na) decays in turn by emitting a gamma ray of 1.27 Mev energy. All these events occur in a very short time, such as a few nanoseconds. Since this time interval is much shorter than the time resolution of the measuring devices, the two 0.511 Mev gamma rays are considered to be emitted simultaneously with said 1.27 Mev gamma ray.

Figure 4:
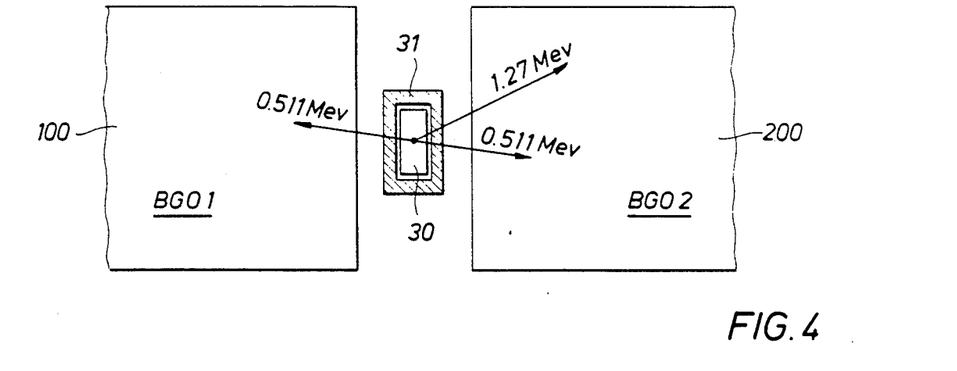
FIG. 4 shows in a greater scale, the ancillary source disposed between the two detectors.

On FIG. 4 are schematically and partially represented, at an enlarged scale, the two detectors disposed end-to-end longitudinally (i.e. in the direction of the sonde axis). The distance separating the two detectors is preferably small, e.g. 0.1 inch (0.25 centimeter). Between the facing ends of the two detectors, is disposed the ancillary source 30. Also shown symbolically is the emission of the two opposed gamma rays of 0.511 Mev and of the 1.27 Mev gamma ray. The source 30 may be placed in a container 31, made of a material having a high Z number (Z stands for the atomic number in the Mendeleev element classification). The container is made e.g. of stainless steel. The goal of the container 31 is to enhance the probability of annihilation of the emitted positron in a relatively short space, i.e. between the facing ends of the detectors.

As already stated, the respective emissions of the two 0.511 Mev gamma rays and the single 1.27 Mev gamma ray are simultaneous. Moreover, the two detector ends are placed very close one to the other. Accordingly, there is a high probability that one detector detects one of the two 0.511 Mev gamma rays, and that the second detector detects, at the same instant, both the other 0.511 Mev and the single 1.27 Mev gamma ray. It may also happen, as an alternative, that the first detector detects only the 1.27 Mev gamma ray, while the second detector detects one 0.511 Mev gamma ray (the other 0.511 Mev gamma ray having e.g. passed through said first detector without being detected). These events in the respective detectors are simultaneous, and are thus detected as coincident events by the coincident circuit 20.

Figure 6:
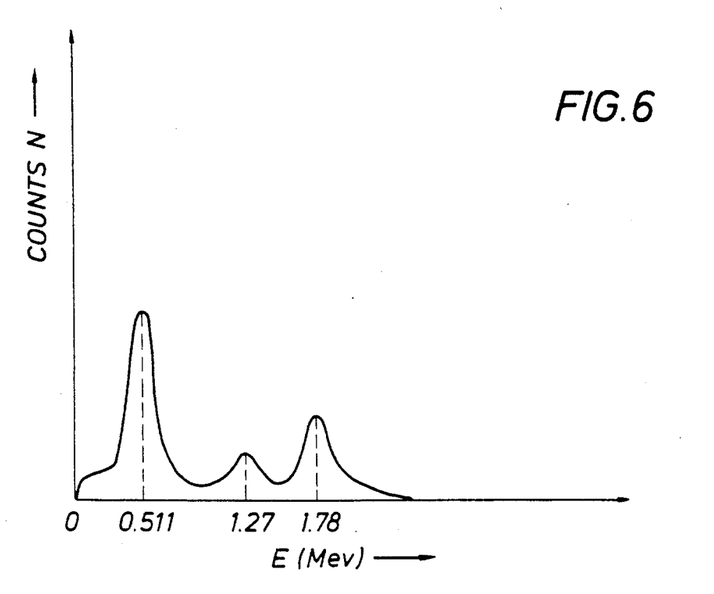
FIG. 6 is an example of a coincidence spectrum obtained from one detector.

FIG. 6 shows an example of a coincidence energy spectrum of the gamma rays detected, in one detector, in coincidence with gamma rays detected by the other detector. The coincidence spectrum shows a first energy peak at 0.511 Mev, a second energy peak at 1.78

Mev, and a third energy peak at 1.27 Mev. The second energy peak (1.78 Mev) corresponds to an energy which is the sum of the energies of first peak (0.511 Mev) and third peak (1.27 Mev). Said second energy peak corresponds to the sum of the energy of said first and third energy peaks.

Figure 5:
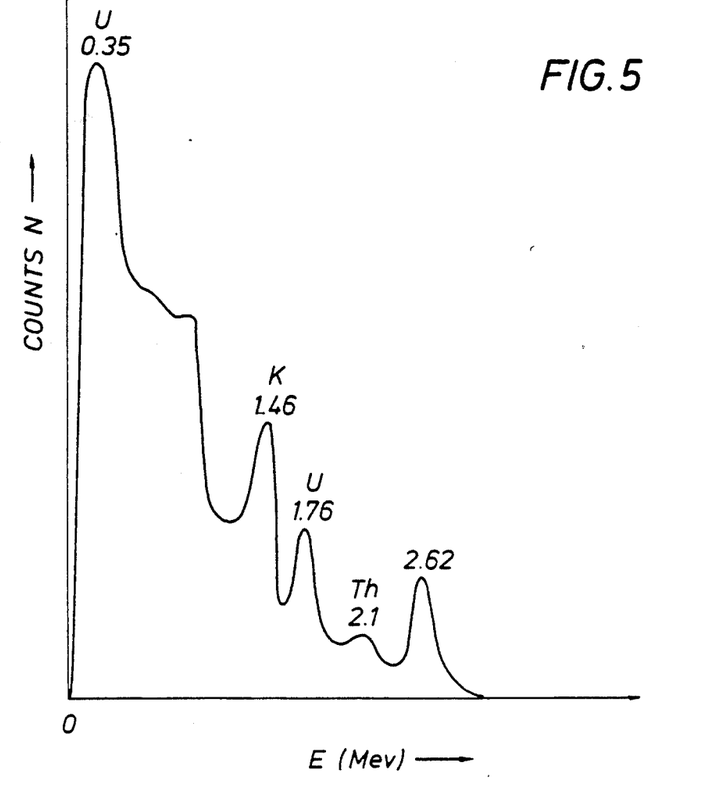
FIG. 5 is a graphical representation of a typical gamma ray non coincident spectrum from natural radioactive earth formations.

FIG. 5 represents an energy spectrum, for one detector, of the non coincident events, i.e. the events which are not simultaneous with the events detected in the other detector. The spectrum shown comprises the usual energy peaks corresponding to the natural radioactive constituents of the earth formations, i.e. 0.35 Mev and 1.76 Mev peaks representative of the uranium, a 1.46 Mev peak representative of the potassium, and a 2.1 and 2.62 Mev peaks representative of the thorium.

Accordingly, two energy spectra are plotted for each detector, to wit a coincident spectrum and a non coincident spectrum. Coincident and non coincident spectra are respectively directed, by memory/plotter 17, to recorder 11, through respective line I and line II shown on FIG. 1. Each of the pulse height analyzers 102, 202 includes a first memory (non coincident) and a second memory (coincident). In case of non coincidence, data from a given detector (100 or 200) is directed to said first memory of the corresponding pulse height analyzer, for establishing a non coincident spectrum. In case of coincidence, i.e. for each event detected simultaneously in both detectors, the coincident circuit 20 directs data to said second memory for the purpose of establishing said coincident spectrum. The coincident circuit 20 acts as a time coincident gate.

Due to the efficiency of the coincidence detection, the ancillary source may be designed to have a very low activity, a few nanoCurie for example. This low activity is of great importance since it allows the ancillary source (i) not to interfere with the measurements, and (ii) to be exempted from most of the stringent regulations related to nuclear sources, in addition to the fact that it is cheap.

Due to temperature or other causes, the energy spectrum may be subject to two kinds of deformation. Firstly, the energy spectrum may be uniformly shifted or translated, so that the spectrum energy scale does not pass through the origin. This shift is usually called "offset", and the corresponding correction is hereafter referred to as "offset correction". Secondly, the spectrum energy scale may be stretched so that its shape changes; in other words, the corresponding shift is not the same along the spectrum energy scale. The correction step for this shift change is hereafter referred to as "gain stabilization".

The gain stabilization is based on a reference peak, in this case, said first peak at 0.511 Mev, and may be carried out in any of the usual manner, such as e.g. the one described in U.S. Pat. No. 3,922,541, especially on FIG. 4 and the corresponding description of said patent, which is hereto incorporated herein by reference, or such as one of the methods described in pages 670–672 of the book from Knoll (already referred to) under the paragraph entitled "Spectrum stabilization".

Figure 7:
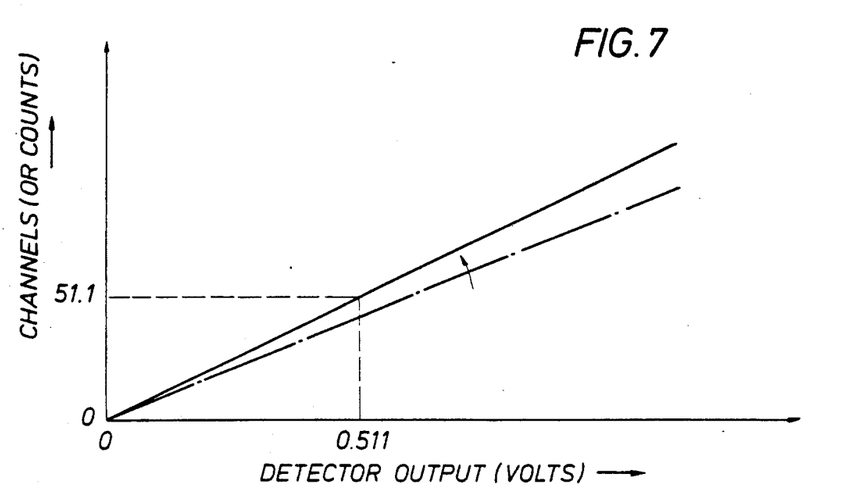
FIG. 7 and FIG. 8 are diagrams showing the relationship between the output of one detector and the corresponding channels or counts, respectively corresponding to the stabilizing step and to the offset correcting step.

As an alternative, the gain stabilization may be carried out in the following way, described further in relation with FIG. 7 where the plain line represents the theoretical linear response of a detector and the dotted line is a representation of the actual response of said detector, corresponding to the shifted spectrum. The centroid of the 0.511 Mev reference peak is assigned to a given reference channel (or count), e.g. No 55.1. The actual centroid of the reference peak is calculated regularly, e.g. every one minute, and in case said actual centroid does not fit the reference channel (or count), the peak is moved (through gain adjustment) to match said reference channel. During this calculation, it is assumed the spectrum is not subject to any offset. Accordingly, the resulting drift of the spectrum might be represented by a rotation (about the origin O) of the straight line (non shifted spectrum), which gives the dotted line (shifted spectrum). This calculation is made by software methods, known by the one skilled in the art, and by devices shown in FIG. 1, where the output of said gain control unit 19 is connected to the input of the modulator 21 furnishing, at its output, a voltage which is a given function of the voltage applied to its input. Finally, the modulator 21 is connected to the high-voltage control unit 23 which sends a signal to the high voltage power supply (not shown) in the sonde 10 to appropriately adjust this high voltage and thus the gain of the detectors.

Figure 8:
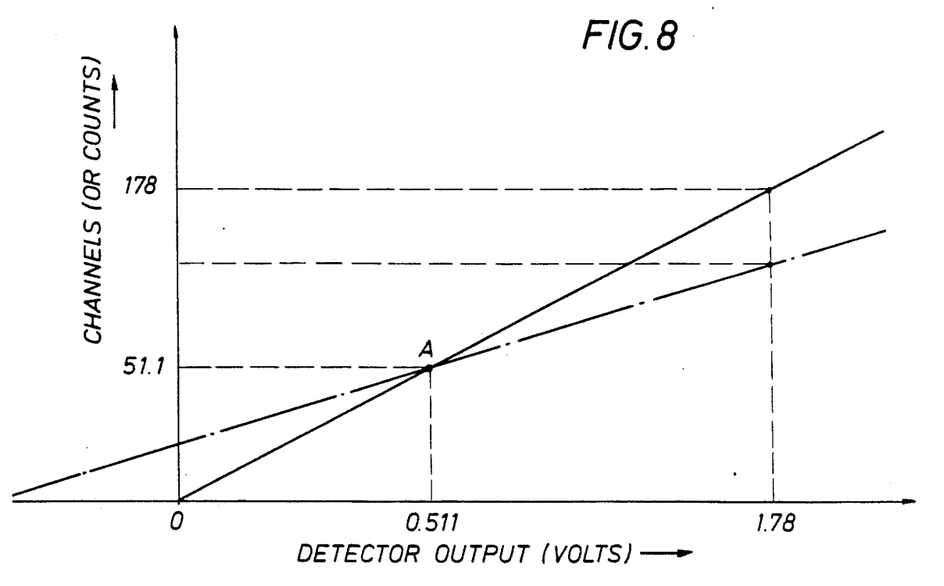

Furthermore, as already stated, the method and apparatus of the invention allow one to calibrate (for offset correction) the energy spectrum curve. The calibrating step is carried out periodically, with a period sensibly longer (e.g. every ten minutes) than the period of the stabilizing step. To this end, with reference to FIG. 8, two reference energy peaks are used, to wit the 0.511 Mev and 1.78 Mev peaks. Assuming the spectrum has been subjected to an offset, the linear response of the detector (on FIG. 8) thus goes from the plain line (non offsetted spectrum) to the dotted line (offsetted spectrum) by a rotation about the point A which abscissa is 0.511 Mev on the plain line of FIG. 8. The point A remains fixed since its abscissa 0.511 Mev has been assigned, during the hereinabove described stabilizing step, a given ordinate, i.e. a given channel. A particular relationship is calculated between the two channel (count) values corresponding to the respective reference 0.511 Mev and 1.78 Mev peaks, and is compared to a reference relationship value, through offset control 25, and an error signal is generated and fed into the appropriate control circuit of the detectors, inside the tool 10. Said relationship is e.g.: (channel of 0.511 Mev)×1.27/(channel of 1.78 Mev−channel of 0.511 Mev). As an alternative for the calibrating step, a third reference peak, the one at 1.27 Mev, may be used in combination with the first and second peaks (0.511 Mev and 1.78 Mev). This brings more accuracy to the offset correction, since three points (i.e. 0.511, 1.27 Mev, and 1.78 Mev), instead of two, are thus provided for determining the optimal response curve.

What is claimed is:

1. Nuclear spectroscopy method for the stabilization of an energy spectrum, made from a signal, emitted by a radiation detector, and containing nuclear events, represented by pulses, whose amplitude is a measure of the energy of the particles, such as gamma rays, collected by said radiation detector, said energy spectrum including at least a first reference energy peak coming from an ancillary nuclear source, comprising the steps of:

(1) using at least two detectors for detecting the radiation under analysis;
  (2) establishing at least one coincident spectrum corresponding to pairs of events simultaneously detected in both detectors and coming from said ancillary source; and (3) stabilizing said coincident spectrum by using one energy peak of said spectrum as said first reference energy peak.

2. The method according to claim 1 wherein said ancillary nuclear source is placed between the respective facing ends of said two detectors.

3. The method according to claim 1 wherein said detectors are both made of bismuth germanate crystal.

4. The method according to claim 1 wherein the nuclear activity of said ancillary source corresponds to a level which is substantially smaller than the activity level of the radiation under analysis.

5. The method according to claim 1 further including the step of establishing a non coincident spectrum representative of the non coincident events.

6. The method according to claim 1 wherein the ancillary source is made of $^{22}$Na.

7. The method according to claim 1 wherein a spectrum calibrating step (for offset correction) of the coincident spectrum is carried out by using said first reference peak and a second reference energy peak.

8. The method according to claim 7 wherein said second reference energy peak comes from said ancillary source.

9. The method according to claim 7 wherein said first reference peak is at 0.511 MeV, and said second reference peak is at 1.78 MeV.

10. The method according to claim 7 wherein said calibrating step further uses a third reference energy peak, and wherein said second energy peak has an energy value which is the sum of the energy values of said first and third peaks.

11. The method according to claim 6 wherein said ancillary source is surrounded by a layer of material having a high atomic number.

12. The method according to claim 1 further establishing a coincident spectrum for each of the detectors, and stabilizing each of said coincident spectra.

13. The method according to claim 7 wherein said stabilizing step and said calibrating step are carried out periodically, and wherein the period of the stabilizing step is shorter than the period of the calibrating step.

14. Nuclear spectroscopy apparatus for the stabilization of an energy spectrum, made from a signal, emitted by a radiation detector, and containing nuclear events, represented by pulses, whose amplitude is a measure of the energy of the particles, such as gamma rays, collected by said radiation detector, said energy spectrum including at least a first reference energy peak coming from an ancillary nuclear source, comprising:
  (1) at least two detectors for detecting the radiation under analysis;
  (2) means for establishing at least one coincident spectrum corresponding to a pair of events simultaneously detected in both detectors and coming from said ancillary source; and
  (3) means for stabilizing said coincident spectrum by using one energy peak of said coincident spectrum as said first reference energy peak.

15. The apparatus according to claim 14 wherein said ancillary nuclear source is placed between the respective facing ends of said two detectors.

16. The apparatus according to claim 14 wherein at least one of said detectors is made of bismuth germanate crystal.

17. The apparatus according to claim 14 further comprising means for establishing, for each detector, a coincident spectrum and further means for stabilizing both coincident spectra.

18. The apparatus according to claim 14 wherein said means for establishing coincident spectrum includes a set of two memories for each detector, to wit a first memory for coincident spectrum and a second memory for non coincident spectrum, and a coincident circuit connected to the output of both detectors and able to, upon coincidence or non coincidence determination, direct data from the respective detectors, to the suitable corresponding memory.

19. The apparatus according to claim 14 wherein the ancillary source is made of $^{22}$Na, allowing the simultaneous emission of a pair of opposed directions gamma rays of 0.511 Mev, and a 1.27 Mev gamma ray.

20. The apparatus according to claim 14 further including means for calibrating said coincident spectrum (for offset correction) designed to use said first reference peak and a second reference energy peak.

21. The apparatus according to claim 20 wherein said second reference energy peak comes from said ancillary source.

22. The apparatus according to claim 20 wherein said first reference peak is at 0.511 MeV, and said second reference peak is at 1.78 MeV.

23. The apparatus according to claim 20 wherein said calibrating means further uses a third reference energy peak, and wherein said second energy peak has an energy value which is the sum of the energy values of said first and third peaks.

24. The apparatus according to claim 14 wherein said ancillary source is surrounded by a layer of material having a high atomic number Z.

25. A logging nuclear spectroscopy method for the stabilization of an energy spectrum, made from a signal, emitted by a radiation detector, and containing nuclear events, represented by pulses, whose amplitude is a measure of the energy of the particles, such as gamma rays, collected by said radiation detector, and coming from earth formations surrounding a borehole in which is lowered a logging tool including said detector, said energy spectrum including at least a first reference energy peak coming from an ancillary nuclear source, said method comprising the steps of:
  (1) using at least two detectors for detecting the radiation under analysis;
  (2) establishing at least one coincident spectrum corresponding to pairs of events simultaneously detected in both detectors and coming from said ancillary source; and
  (3) stabilizing said coincident spectrum by using one energy peak of said spectrum as said first reference energy peak.

26. The method according to claim 25 wherein a spectrum calibrating step (for offset correction) of the coincident spectrum is carried out by using said first reference peak and a second reference energy peak coming from said ancillary source.

27. A logging nuclear spectroscopy apparatus for the stabilization of an energy spectrum, made from a signal, emitted by a radiation detector, and containing nuclear events, represented by pulses, whose amplitude is a measure of the energy of the particles, such as gamma rays, collected by said radiation detector, and coming from earth formations surrounding a borehole in which is lowered a logging tool including said detector, said energy spectrum including at least a first reference energy peak coming from an ancillary nuclear source, comprising:
(1) two detectors for detecting the radiation under analysis;
(2) means for establishing at least one coincident spectrum corresponding to pairs of events simultaneously detected in both detectors and coming from said ancillary source; and
(3) means for stabilizing said coincident spectrum by using one energy peak of said coincident spectrum as said first reference energy peak.

28. The apparatus according to claim 27 wherein it further includes means for calibrating said coincident spectrum (for offset correction) designed to use said first reference peak and a second reference energy peak which comes from said ancillary source.

29. Nuclear spectroscopy method for the offset correction of an energy spectrum, made from a signal, emitted by a radiation detector, and containing nuclear events, represented by pulses, whose amplitude is a measure of the energy of the particles, such as gamma rays, collected by said radiation detector, said energy spectrum including at least a first reference energy peak coming from an ancillary nuclear source, comprising the steps of:
(1) using at least two detectors for detecting the radiation under analysis;
(2) establishing at least one coincident spectrum corresponding to pairs of events simultaneously detected in both detectors and coming from said ancillary source; and
(3) calibrating (for offset correction) said coincident spectrum by using a first energy peak of said spectrum as said first reference energy peak and a second reference energy peak.

* * * * *